US012792948B2

(12) United States Patent
Dominy et al.

(10) Patent No.: US 12,792,948 B2
(45) Date of Patent: Nov. 10, 2026

(54) FILTER-AWARE VOLTAGE SIGNAL SEQUENCE DETERMINATION FOR TRANSPORT OPERATIONS

(71) Applicant: Quantinuum LLC, Broomfield, CO (US)

(72) Inventors: Jason Dominy, Broomfield, CO (US); Maya Fabrikant, Broomfield, CO (US); Steven Moses, Broomfield, CO (US); Daniel Gresh, Broomfield, CO (US); Matthew Swallows, Broomfield, CO (US); David Hayes, Broomfield, CO (US)

(73) Assignee: Quantinuum LLC, Broomfield, CO (US)

( * ) Notice: Subject to any disclaimer, the term of this patent is extended or adjusted under 35 U.S.C. 154(b) by 461 days.

(21) Appl. No.: 18/495,928

(22) Filed: Oct. 27, 2023

(65) Prior Publication Data

US 2024/0160985 A1 May 16, 2024

Related U.S. Application Data

(60) Provisional application No. 63/383,606, filed on Nov. 14, 2022.

(51) Int. Cl.
*G06N 10/40* (2022.01)
*H04B 10/70* (2013.01)

(52) U.S. Cl.
CPC ............. *G06N 10/40* (2022.01); *H04B 10/70* (2013.01)

(58) Field of Classification Search
CPC ......... G06N 10/40; G06N 10/20; H04B 10/70
See application file for complete search history.

(56) References Cited

U.S. PATENT DOCUMENTS

| | | | | |
|---|---|---|---|---|
| 11,025,228 B1 * | 6/2021 | Ascarrunz | .............. | G06N 10/40 |
| 2016/0211128 A1 * | 7/2016 | Williams, Jr. | ........ | H01J 49/065 |

(Continued)

FOREIGN PATENT DOCUMENTS

JP 2022-119214 A 8/2022

OTHER PUBLICATIONS

Blakestad, R. Bradford, "Transport of Trapped-Ion Qubits within a Scalable Quantum Processor," Ph.D. Thesis, University of Colorado (Dec. 2010) retrieved from the Internet at <URL: https://www.nist.gov/system/files/documents/2017/05/09/blakestad2010thesis.pdf> on Feb. 15, 2024, 240 pages.

(Continued)

*Primary Examiner* — Ricky Go
(74) *Attorney, Agent, or Firm* — Alston & Bird LLP

(57) ABSTRACT

A controller is configured to control operation of a confinement apparatus comprising one or more radio frequency rails and a plurality of control electrodes. The controller comprises a processing element, non-transitory computer-readable memory storing computer-executable instructions. The computer-executable instructions are configured to, when executed by the processing element, cause the controller to at least identify a manipulatable object transport operation to be performed; obtain a set of voltage signal sequences corresponding to the manipulatable object transport operation to be performed from the voltage signal sequence library; and cause one or more voltage sources to apply respective voltage signal sequences of the set of voltage signal sequences corresponding to the manipulatable object transport operation to respective control electrodes of the plurality of control electrodes via respective filters. The set of voltage signal sequences is determined based at least in part on respective filter responses of the respective filters.

20 Claims, 8 Drawing Sheets

(56) References Cited

U.S. PATENT DOCUMENTS

| | | | | |
|---|---|---|---|---|
| 2021/0342730 A1* | 11/2021 | Redmond | .............. | G06N 10/40 |
| 2022/0037313 A1 | 2/2022 | Deen et al. | | |
| 2022/0247386 A1 | 8/2022 | Barnes et al. | | |
| 2023/0325698 A1* | 10/2023 | Furtner | .................. | G06N 10/40<br>716/100 |

OTHER PUBLICATIONS

Bowler, R., et al., "Arbitrary waveform generator for quantum information processing with trapped ions", submitted Feb. 28, 2013 to the Cornell University Library Online Archive, retrieved from the Internet at https://arxiv.org/pdf/1301.2543 on May 9, 2024, 6 pages.
Bowler, Ryan, "Coherent Ion Transport in a Multi-electrode Trap Array", Thesis, University of Colorado, Jan. 2015, 159 pages, retrieved from the Internet at https//www.nist.gov/system/files/documents/2017/05/09/Bowler15_thesis-2.pdf on Feb. 15, 2024.
Kaufmann, Henning, "A Scalable Quantum Processor", Dissertation, Johannes Gutenberg-Universitat, Mainz, Aug. 2017, 220 pages, retrieved from the Internet at https://openscience.ub.uni-mainz.de/bitstream/20.500.12030/2848/1/100001898.pdf, on Feb. 15, 2024.
Outgoing—ISA/210—International Search Report Mailed on Feb 26, 2024 for WO Application No. PCT/US23/036557, 5 page(s).
Outgoing Written Opinion of the ISA Mailed on Feb. 26, 2024 for WO Application No. PCT/US23/036557, 7 page(s).
Torrontegui, E., et al., "Fast atomic transport without vibrational heating", Physics Review A, submitted Oct. 15, 2010 to Cornell University Library Online Archive, retrieved from the Internet at https://arxiv.org/abs/1010.3271 on May 9, 2024, 10 pages.
English Translation of JP Office Action, including Search Report dated Jun. 2, 2026 for JP Application No. 2025527798, 16 page(s).
JP Office Action, including Search Report Mailed on Jun. 2, 2026 for JP Application No. 2025527798, 13 page(s).

* cited by examiner

FILTER-AWARE VOLTAGE SIGNAL SEQUENCE DETERMINATION FOR TRANSPORT OPERATIONS

CROSS-REFERENCE TO RELATED APPLICATIONS

This application claims priority to U.S. Application No. 63/383,606, filed Nov. 14, 2022, the content of which is incorporated herein by reference in its entirety.

TECHNICAL FIELD

Various embodiments relate to the determination and use of sets of voltage signal sequences for causing transport of one or more manipulatable objects from a starting location(s) to a destination location(s) of a confinement apparatus. For example, an example embodiment relates to the determination and use of sets of voltage signal sequences where the determination of the sets of voltage signal sequences are aware of the filter responses of the filters used to filter the voltage signals applied to control electrodes based at least in part on the sets of voltage signal sequences.

BACKGROUND

Voltage signals applied to electrodes of an ion trap are often filtered to reduce the effects of noise in the voltage signals on ions confined by the ion trap. However, such filtering may degrade the effectiveness of the applied voltage signals to perform the desired function. Through applied effort, ingenuity, and innovation many deficiencies of prior systems have been solved by developing solutions that are structured in accordance with the embodiments of the present invention, many examples of which are described in detail herein.

BRIEF SUMMARY OF EXAMPLE EMBODIMENTS

Example embodiments provide methods, systems, apparatuses, computer program products, controllers configured to control operation of confinement apparatuses, and/or the like for determining and using sets of voltage signal sequences where the determination of a set of voltage signal sequences takes into account the filter response of the filters that will be used to filter the voltage signals applied to the control electrodes of a confinement apparatus. For example, a set of voltage signal sequences may be determined for causing one or more manipulatable objects confined by a confinement apparatus to be transported from a starting location(s) of the confinement apparatus to a destination location(s) of the confinement apparatus based at least in part on the filter responses of the filters used to filter the voltages applied to the control electrodes of the confinement apparatus.

According to a first aspect, a controller configured to control operation of a confinement apparatus comprising one or more radio frequency rails and a plurality of control electrodes is provided. In an example embodiment, the controller comprises a processing element, at least one non-transitory computer-readable memory storing computer-executable instructions and a voltage signal sequence library. The computer-executable instructions are configured to, when executed by the processing element, cause the controller to at least identify a manipulatable object transport operation to be performed; obtain a set of voltage signal sequences corresponding to the manipulatable object transport operation to be performed from the voltage signal sequence library; and cause one or more voltage sources to apply respective voltage signal sequences of the set of voltage signal sequences corresponding to the manipulatable object transport operation to respective control electrodes of the plurality of control electrodes via respective filters. The set of voltage signal sequences is determined based at least in part on respective filter responses of the respective filters.

In an example embodiment, each voltage signal sequence of the set of voltage signal sequences is a time-ordered sequence of voltage signals with each voltage signal corresponding to a time step of a plurality of time steps of the manipulatable object transport operation.

In an example embodiment, the voltage signals for each time step of the plurality of time steps of the set of voltage signal sequences are determined synchronously.

In an example embodiment, the computer-executable instructions are further configured to, when executed by the processing element, cause the controller to at least cause an applied voltage signal to transition smoothly between an ith voltage signal of the voltage signal sequence corresponding to an ith time step of the plurality of time steps to an i+1th voltage signal of the voltage signal sequence corresponding to an i+1th time step of the plurality of time steps.

In an example embodiment, the set of voltage signal sequences is configured to cause one or more manipulatable object to be transported from one or more respective starting locations of the manipulatable object transport operation to one or more respective destination locations of the manipulatable object transport operation with respective transport profiles having at least first and second derivatives that are equal to zero at the starting location and at the destination location.

In an example embodiment, the respective transport profile is a sigmoidal function.

In an example embodiment, the respective filters are low pass filters.

In an example embodiment, at least one of the respective filter responses is empirically determined.

In an example embodiment, the set of voltage signal sequences is determined based at least in part on apparatus and transportation considerations.

In an example embodiment, the set of voltage signal sequences is configured to cause one or more manipulatable objects to be transported from one or more respective starting locations of the manipulatable object transport operation to one or more respective destination locations of the manipulatable object transport operation with the one or more manipulatable objects being in a respective motional state of a same energy at both the respective starting locations and the respective destination locations.

According to another aspect, a system is provided. In an example embodiment, the system comprises a confinement apparatus comprising one or more radio frequency rails and a plurality of control electrodes, a plurality of voltage sources, and a plurality of filters. Respective voltage sources of the plurality of voltage sources are configured to generate voltage signals and provide the voltage signals to respective filters of the plurality of filters. The respective filters are configured to generate respective filtered voltage signals and provide the respective filtered voltage signals to respective control electrodes of the plurality of control electrodes. The system further comprises a controller configured to control operation of at least the confinement apparatus and the plurality of voltage sources. The controller comprises a processing element, at least one non-transitory computer-readable memory storing computer-executable instructions and a voltage signal sequence library. The computer-executable instructions are configured to, when executed by the processing element, cause the controller to at least identify a manipulatable object transport operation to be performed; obtain a set of voltage signal sequences corresponding to the manipulatable object transport operation to be performed from the voltage signal sequence library; and cause one or more voltage sources to apply respective voltage signal sequences of the set of voltage signal sequences corresponding to the manipulatable object transport operation to respective control electrodes of the plurality of control electrodes via respective filters. The set of voltage signal sequences is determined based at least in part on respective filter responses of the respective filters.

In an example embodiment, each voltage signal sequence of the set of voltage signal sequences is a time-ordered sequence of voltage signals with each voltage signal corresponding to a time step of a plurality of time steps of the manipulatable object transport operation.

In an example embodiment, the voltage signals for each time step of the plurality of time steps of the set of voltage signal sequences are determined synchronously.

In an example embodiment, the computer-executable instructions are further configured to, when executed by the processing element, cause the controller to at least cause an applied voltage signal to transition smoothly between an ith voltage signal of the voltage signal sequence corresponding to an ith time step of the plurality of time steps to an i+1th voltage signal of the voltage signal sequence corresponding to an i+1th time step of the plurality of time steps.

In an example embodiment, the set of voltage signal sequences is configured to cause one or more manipulatable objects to be transported from one or more respective starting locations of the manipulatable object transport operation to one or more respective destination locations of the manipulatable object transport operation with respective transport profiles having at least first and second derivatives that are equal to zero at the one or more respective starting locations and at the one or more respective destination locations.

In an example embodiment, the respective transport profile is a sigmoidal function.

In an example embodiment, the respective filters are low pass filters.

In an example embodiment, at least one of the respective filter responses is empirically determined.

In an example embodiment, the set of voltage signal sequences is determined based at least in part on apparatus and transportation considerations.

In an example embodiment, the set of voltage signal sequences is configured to cause one or more manipulatable objects to be transported from one or more respective starting locations of the manipulatable object transport operation to one or more respective destination locations of the manipulatable object transport operation with the one or more manipulatable objects being in a respective motional state of a same energy at both the respective starting locations and the respective destination locations.

According to yet another aspect, a method performed by a controller configured to control operation of one or more voltage sources is provided. In an example embodiment, the one or more voltage signals are configured to be operable to generate respective voltage signals and provide the respective voltage signals to respective filters such that the respective filters generate respective filtered voltage signals and provide the respective voltage signals to respective control electrodes of a confinement apparatus. In an example embodiment, the method comprises causing identification of a manipulatable object transport operation to be performed; obtaining a set of voltage signal sequences corresponding to the manipulatable object transport operation to be performed from a voltage signal sequence library; and causing (e.g., controlling operation of) one or more voltage sources to apply respective voltage signal sequences of the set of voltage signal sequences corresponding to the manipulatable object transport operation to respective control electrodes of the plurality of control electrodes via respective filters. The set of voltage signal sequences is determined based at least in part on respective filter responses of the respective filters.

In an example embodiment, each voltage signal sequence of the set of voltage signal sequences is a time-ordered sequence of voltage signals with each voltage signal corresponding to a time step of a plurality of time steps of the manipulatable object transport operation.

In an example embodiment, the voltage signals for each time step of the plurality of time steps of the set of voltage signal sequences are determined synchronously.

In an example embodiment, the method further comprises causing an applied voltage signal to transition smoothly between an ith voltage signal of the voltage signal sequence corresponding to an ith time step of the plurality of time steps to an i+1th voltage signal of the voltage signal sequence corresponding to an i+1th time step of the plurality of time steps.

In an example embodiment, the set of voltage signal sequences is configured to cause one or more manipulatable objects to be transported from one or more respective starting locations of the manipulatable object transport operation to one or more respective destination locations of the manipulatable object transport operation with a respective transport profile having at least first and second derivatives that are equal to zero at the one or more respective starting locations and at the one or more respective destination locations.

In an example embodiment, the respective transport profile is a sigmoidal function.

In an example embodiment, the respective filters are low pass filters.

In an example embodiment, at least one of the respective filter responses is empirically determined.

In an example embodiment, the set of voltage signal sequences is determined based at least in part on apparatus and transportation considerations.

In an example embodiment, the set of voltage signal sequences is configured to cause one or more manipulatable objects to be transported from one or more respective starting locations of the manipulatable object transport operation to one or more respective destination locations of the manipulatable object transport operation with the one or more manipulatable objects being in a respective motional state of a same energy at both the respective starting locations and the respective destination locations.

According to still another aspect, a computer-executable method for determining a set of voltage signal sequences corresponding to a manipulatable object transport operation to be performed within a confinement region defined by a confinement apparatus comprising one or more radio frequency rails and a plurality of control electrodes is provided. The method comprises obtaining filter response representations for one or more filters configured to filter respective voltage signals being applied to respective control electrodes of the plurality of control electrodes; obtaining an apparatus and transport consideration representation, wherein the apparatus and transport consideration representation at least encodes a relative physical layout of the plurality of control electrodes; and based at least in part on the filter response representations and the apparatus and transport consideration representation, synchronously determining a set of voltage signal sequences corresponding to transport of one or more manipulatable objects from one or more respective starting locations of the confinement apparatus to one or more respective destination locations of the confinement apparatus over a period of time. Each voltage signal sequence of the set of voltage signal sequences is a time-ordered sequence of voltage signals to be applied to a respective control electrode of the plurality of control electrodes via a respective filter of the one or more filters over a plurality of time steps of the period of time.

In an example embodiment, the method further comprises causing the set of voltage sequences to be stored to a voltage signal sequence library accessible to a controller configured to control operation of the confinement apparatus.

In an example embodiment, the set of voltage signal sequences is configured to cause the one or more manipulatable objects to be transported from the one or more respective starting locations to the one or more respective destination locations with a respective transport profile having at least first and second derivatives that are equal to zero at the respective starting locations and at the respective destination locations.

In an example embodiment, the respective transport profile is a sigmoidal function.

In an example embodiment, the one or more filters comprise low pass filters.

In an example embodiment, at least one of the filter response representations is determined by empirically measuring a filter response of the respective filter and transforming the filter response into a filter response representation.

In an example embodiment, the filter response representation causes a linking of an i+1th time step of the plurality of time steps to an ith time step of the plurality of time steps.

In an example embodiment, the set of voltage signal sequences is configured to cause one or more manipulatable objects to be transported from one or more respective starting locations of the manipulatable object transport operation to one or more respective destination locations of the manipulatable object transport operation with the one or more manipulatable object being in a respective motional state of a same energy at both the respective starting location and the respective destination location.

In an example embodiment, the method further comprises obtaining lower and upper bound representations, wherein the lower and upper bound representations and the apparatus and transport consideration representation constrain an available solution space within which the set of voltage signal sequences is determined.

According to another aspect, an apparatus configured to determine a set of voltage signal sequences corresponding to a manipulatable object transport operation to be performed within a confinement region defined by a confinement apparatus comprising one or more radio frequency rails and a plurality of control electrodes is provided. In an example embodiment, the apparatus comprises a processing element and at least one non-transitory computer-readable memory storing computer-executable instructions, the computer-executable instructions configured to, when executed by the processing element, cause the apparatus to at least obtain filter response representations for one or more filters configured to filter respective voltage signals being applied to respective control electrodes of a plurality of control electrodes; obtain an apparatus and transport consideration representation, wherein the apparatus and transport consideration representation at least encodes a relative physical layout of the plurality of control electrodes; and based at least in part on the filter response representations and the apparatus and transport consideration representation, synchronously determine a set of voltage signal sequences corresponding to transport of one or more manipulatable objects from one or more respective starting locations of a confinement apparatus comprising the plurality of control electrodes to one or more respective destination locations of the confinement apparatus over a period of time. Each voltage signal sequence of the set of voltage signal sequences is a time-ordered sequence of voltage signals to be applied to a respective control electrode of the plurality of control electrodes via a respective filter of the one or more filters over a plurality of time steps of the period of time.

In an example embodiment, the computer-executable instructions are further configured to, when executed by the processing element, cause the apparatus to cause the set of voltage sequences to be stored to a voltage signal sequence library accessible to a controller configured to control operation of the confinement apparatus.

In an example embodiment, the set of voltage signal sequences is configured to cause the one or more manipulatable objects to be transported from the one or more respective starting locations to the one or more respective destination locations with a transport profile having at least first and second derivatives that are equal to zero at the starting location and at the destination location.

In an example embodiment, the respective transport profile is a sigmoidal function.

In an example embodiment, the one or more filters comprise low pass filters.

In an example embodiment, at least one of the filter response representations is determined by empirically measuring a filter response of the respective filter and transforming the filter response into a filter response representation.

In an example embodiment, the filter response representation causes a linking of an i+1th time step of the plurality of time steps to an ith time step of the plurality of time steps.

In an example embodiment, the set of voltage signal sequences is configured to cause one or more manipulatable objects to be transported from one or more starting locations of the manipulatable object transport operation to one or more destination locations of the manipulatable object transport operation with the one or more manipulatable objects being in a respective motional state of a same energy at both the one or more respective starting locations and the one or more respective destination locations.

In an example embodiment, the computer-executable instructions are further configured to, when executed by the processing element, cause the apparatus to obtain lower and upper bound representations, wherein the lower and upper bound representations and the apparatus and transport consideration representation constrain an available solution space within which the set of voltage signal sequences is determined.

According to still another aspect, a computer program product configured to cause an apparatus to determine a set of voltage signal sequences corresponding to a manipulatable object transport operation to be performed within a confinement region defined by a confinement apparatus comprising one or more radio frequency rails and a plurality of control electrodes is provided. In an example embodiment, the computer program product comprises at least one non-transitory computer-readable memory storing computer-executable instructions, the computer-executable instructions configured to, when executed by a processing element of an apparatus, cause the apparatus to at least obtain filter response representations for one or more filters configured to filter respective voltage signals being applied to respective control electrodes of a plurality of control electrodes; obtain an apparatus and transport consideration representation, wherein the apparatus and transport consideration representation at least encodes a relative physical layout of the plurality of control electrodes; and based at least in part on the filter response representations and the apparatus and transport consideration representation, synchronously determine a set of voltage signal sequences corresponding to transport of one or more manipulatable objects from one or more respective starting locations of a confinement apparatus comprising the plurality of control electrodes to one or more respective destination locations of the confinement apparatus over a period of time. Each voltage signal sequence of the set of voltage signal sequences is a time-ordered sequence of voltage signals to be applied to a respective control electrode of the plurality of control electrodes via a respective filter of the one or more filters over a plurality of time steps of the period of time.

In an example embodiment, the computer-executable instructions are further configured to, when executed by the processing element, cause the apparatus to cause the set of voltage sequences to be stored to a voltage signal sequence library accessible to a controller configured to control operation of the confinement apparatus.

In an example embodiment, the set of voltage signal sequences is configured to cause the one or more manipulatable object to be transported from the one or more respective starting locations to the one or more respective destination locations with a transport profile having at least first and second derivatives that are equal to zero at the one or more respective starting location and at the one or more respective destination locations.

In an example embodiment, the respective transport profile is a sigmoidal function.

In an example embodiment, the one or more filters comprise low pass filters.

In an example embodiment, at least one of the filter response representations is determined by empirically measuring a filter response of the respective filter and transforming the filter response into a filter response representation.

In an example embodiment, the filter response representation causes a linking of an i+1th time step of the plurality of time steps to an ith time step of the plurality of time steps.

In an example embodiment, the set of voltage signal sequences is configured to cause one or more manipulatable objects to be transported from one or more respective starting locations of the manipulatable object transport operation to one or more respective destination locations of the manipulatable object transport operation with the one or more manipulatable objects being in a respective motional state of a same energy at both the one or more respective starting locations and the one or more respective destination locations.

In an example embodiment, the computer-executable instructions are further configured to, when executed by the processing element, cause the apparatus to obtain lower and upper bound representations, wherein the lower and upper bound representations and the apparatus and transport consideration representation constrain an available solution space within which the set of voltage signal sequences is determined.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 6:
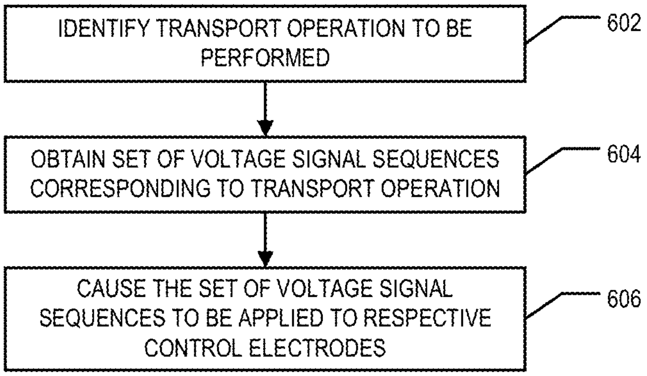
Figure 7:
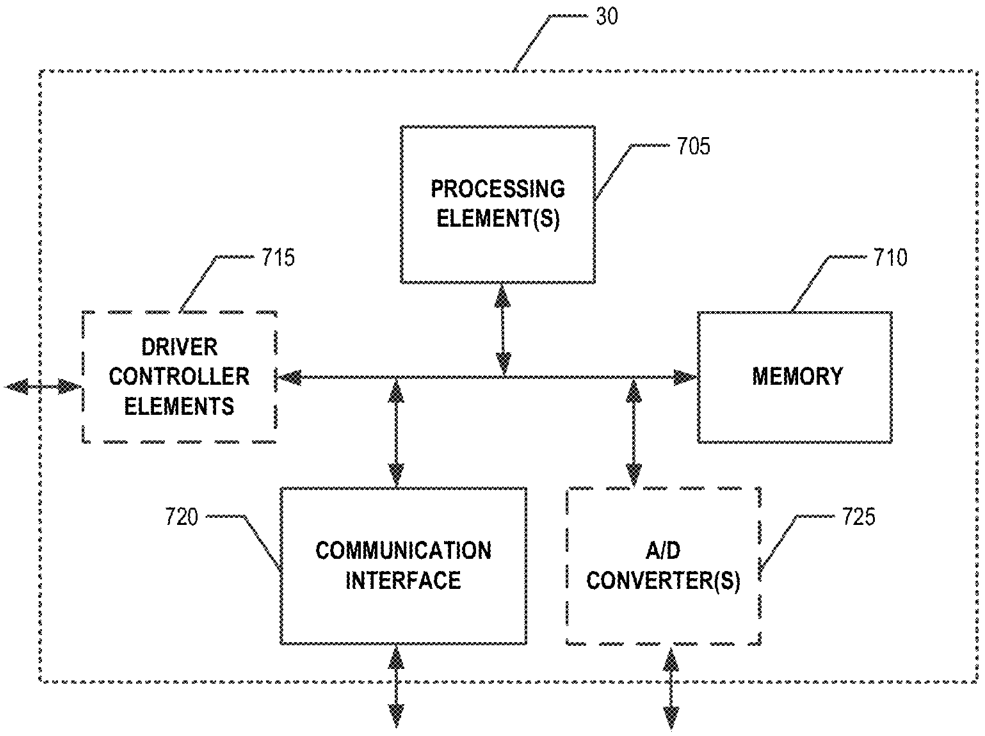

FIG. 6 is a flowchart illustrating various process, operations, and/or procedures performed by a controller configured to control operation of a confinement apparatus, such as the controller of FIG. 7, to use a set of voltage signal sequences to cause one or more manipulatable objects to be transported from one or more respective starting locations of the confinement apparatus to one or more respective destination locations of the confinement apparatus, according to various embodiments.

FIG. 7 provides a schematic diagram of an example controller configured to control operation of a confinement apparatus, according to an example embodiment.

Figure 8:
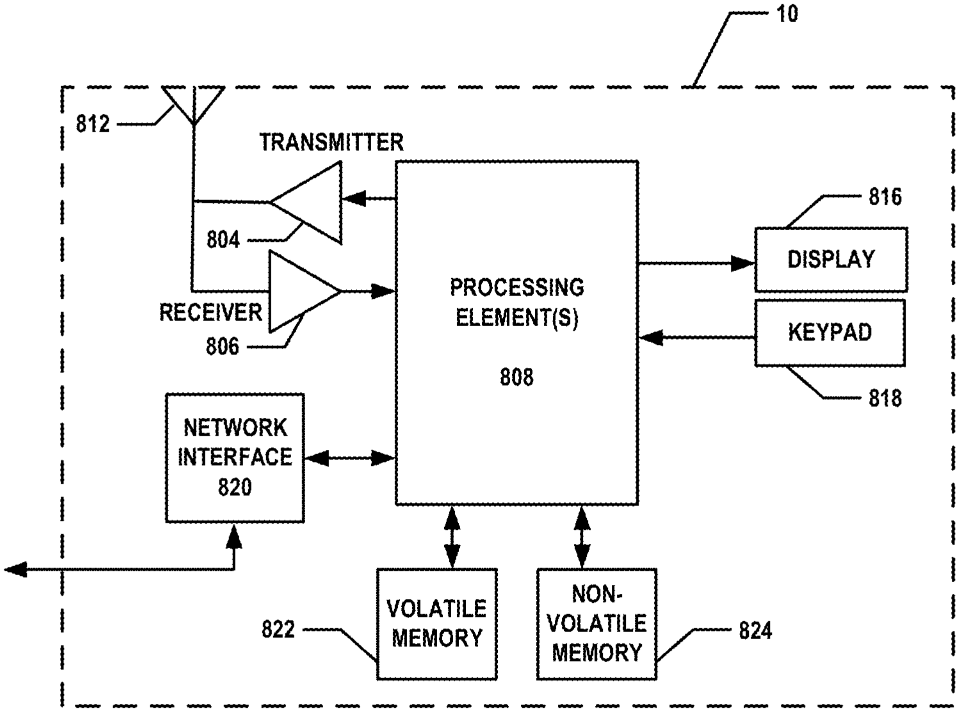

FIG. 8 provides a schematic diagram of an example computing entity that may be used in accordance with an example embodiment.

DETAILED DESCRIPTION OF SOME EXAMPLE EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. The terms "generally," "substantially," and "approximately" refer to within engineering and/or manufacturing tolerances and/or within user measurement capabilities, unless otherwise indicated. Like numbers refer to like elements throughout.

Example embodiments provide methods; systems; apparatuses; computer program products; controllers configured to control operation of confinement apparatuses, atomic systems, and/or quantum processors; and/or the like for determining and using sets of voltage signal sequences where the determination of a set of voltage signal sequences takes into account the filter response of the filters that will be used to filter the voltage signals applied to the control electrodes of a confinement apparatus. For example, a set of voltage signal sequences may be determined for causing one or more manipulatable objects confined by a confinement apparatus to be transported from one or more respective starting locations of the confinement apparatus to one or more respective destination locations of the confinement apparatus based at least in part on the filter responses of the filters used to filter the voltages applied to the control electrodes of the confinement apparatus. In various embodiments, the confinement apparatus is an ion trap. In various embodiments, the manipulatable objects are neutral or ionic atoms; neutral, multipole or charged molecules; charged particles; quantum particles; quantum dots; and/or the like and/or groups or crystals thereof.

Example System Architecture

Figure 1:
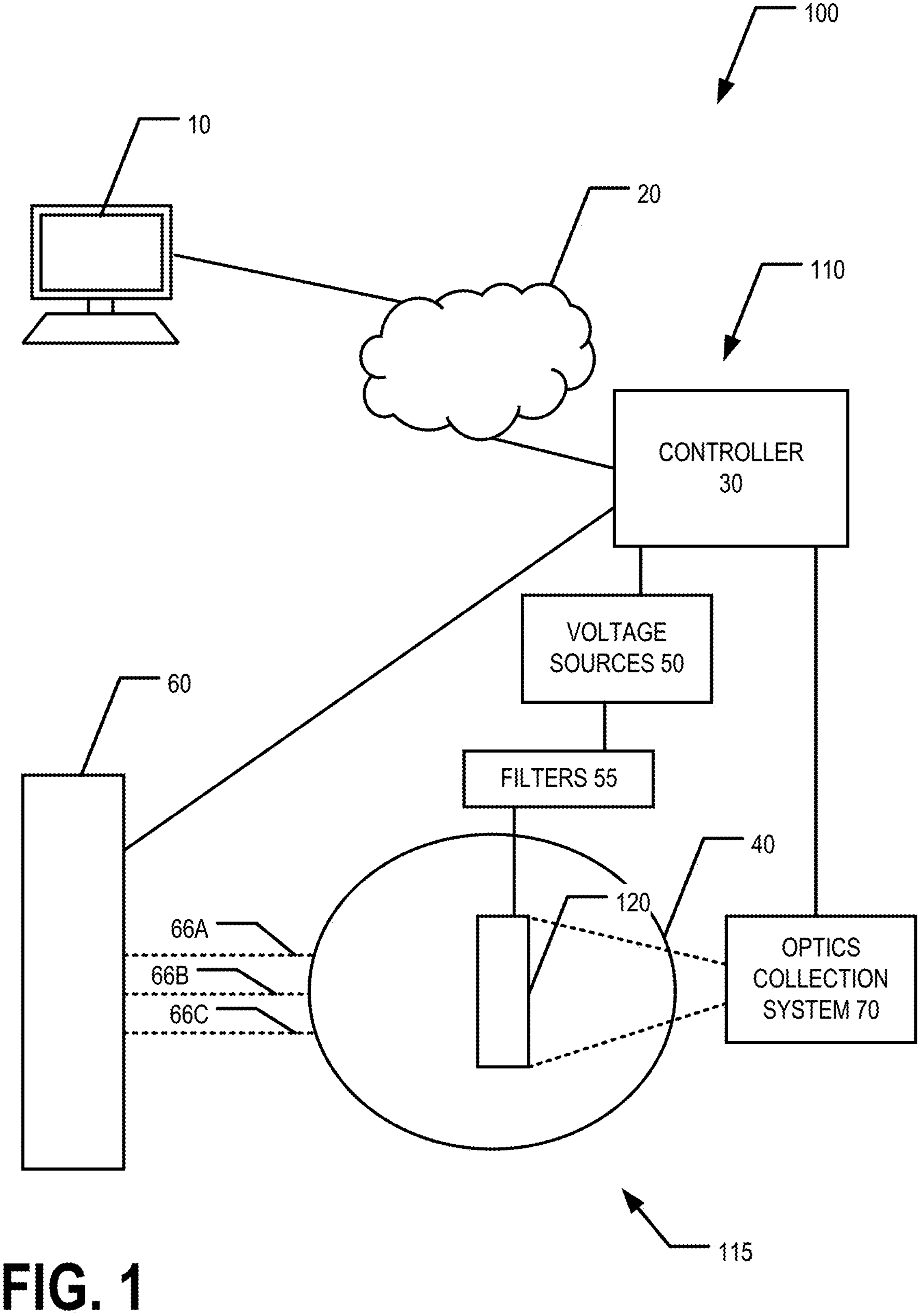
FIG. 1 is a schematic diagram illustrating an example system comprising a controller configured to control operation of a confinement apparatus, according to an example embodiment.

FIG. 1 illustrates one example system where a confinement apparatus 120 is used to confine manipulatable objects such that various functions may be performed on the manipulatable objects. For example, in various embodiments, the confinement apparatus 120 is an ion trap and/or the like. For example, in various embodiments, the manipulatable objects are neutral or ionic atoms; neutral, multipole or charged molecules; charged particles; quantum particles; quantum dots; and/or the like and/or groups or crystals thereof. Various functions may be performed on the manipulatable objects such as quantum state preparation, performance of logistical gates, state reading/determination, cooling, transport between different locations of the confinement apparatus 120, and/or the like.

In the illustrated embodiment of a system comprising a confinement apparatus 120, the system is a quantum computing system 100 based on a quantum charge-coupled device (QCCD) architecture. In the illustrated embodiment, the quantum computing system 100 comprises a computing entity 10 and a quantum computer 110. In various embodiments, the quantum computer 110 comprises a quantum system controller 30 and a quantum processor 115. In various embodiments, the quantum system controller 30 is configured, programmed, and/or the like to control the quantum processor 115 and/or various components thereof. For example, the quantum processor 115 comprises a confinement apparatus 120 configured to confine a plurality of manipulatable objects. The quantum system controller 30 is configured to control operation of the confinement apparatus 120. In an example embodiment, the quantum processor 115 comprises a plurality of qubits (e.g., data qubits that may be organized into logical qubits, ancilla qubits, and/or the like). In various embodiments, each qubit of the plurality of qubits is embodied by a respective manipulatable object of the plurality of manipulatable objects confined by the confinement apparatus 120. In various embodiments, the quantum computer 110 includes or communicates with databases (not shown), such as a voltage signal sequency library. For example, the databases may be stored by one or more computing entities 10 that are in communication with the controller 30 via one or more wired and/or wireless networks 20 and/or stored by memory local to the controller 30.

In various embodiments, the quantum processor 115 comprises means for controlling the evolution of quantum states of the qubits. For example, in an example embodiment, the quantum processor 115 comprises a cryostat and/or vacuum chamber 40 enclosing a confinement apparatus 120 (e.g., an ion trap and/or the like), one or more manipulation sources 60, one or more voltage sources 50, and/or one or more optics collection systems 70. For example, the cryostat and/or vacuum chamber 40 may be a temperature and/or pressure-controlled chamber. In an example embodiment, the one or more manipulation sources 60 may comprise one or more lasers (e.g., optical lasers, microwave sources, and/or the like). In various embodiments, the one or more manipulation sources 60 are configured to manipulate and/or cause a controlled quantum state evolution of one or more manipulatable objects confined by the confinement apparatus 120. In various embodiments, the manipulatable objects within the confinement apparatus 120 (e.g., ions and/or ion crystals/groups trapped within an ion trap) act as the data qubits and/or ancilla qubits of the quantum processor 115 of the quantum computer 110. For example, in an example embodiment, wherein the one or more manipulation sources 60 comprise one or more lasers, the lasers may provide one or more laser beams to manipulatable objects confined by the confinement apparatus 120 within the cryostat and/or vacuum chamber 40. For example, the manipulation sources 60 may generate and/or provide laser beams configured to ionize manipulatable objects, initialize manipulatable objects within the defined two state qubit space of the quantum processor, perform gates one or more qubits of the quantum processor, read a quantum state of one or more qubits of the quantum processor, and/or the like.

In various embodiments, the quantum computer 110 comprises an optics collection system 70 configured to collect and/or detect photons generated by qubits (e.g., during reading procedures). The optics collection system 70 may comprise one or more optical elements (e.g., lenses, mirrors, waveguides, fiber optics cables, reflective and/or transmissive metasurfaces, and/or the like) and one or more photodetectors. In various embodiments, the photodetectors may be photodiodes, photomultipliers, charge-coupled device (CCD) sensors, complementary metal oxide semiconductor (CMOS) sensors, Micro-Electro-Mechanical Systems (MEMS) sensors, and/or other photodetectors that are sensitive to light at an expected fluorescence wavelength of the qubits of the quantum computer 110. In various embodiments, the detectors may be in electronic communication with the quantum system controller 30 via one or more A/D converters 725 (see FIG. 7) and/or the like.

In various embodiments, the quantum computer 110 comprises one or more voltage sources 50. For example, the voltage sources 50 may comprise a plurality of voltage drivers and/or voltage sources and/or at least one RF driver and/or voltage source. For example, in various embodiments, the voltage sources 50 include a plurality of arbitrary waveform generators (AWGs), direct digital synthesizers (DDS), and/or the like. The voltage sources 50 may be electrically coupled to the corresponding potential generating elements (e.g., electrodes) of the confinement apparatus 120, in an example embodiment. In various embodiments, the voltage signals generated by the voltage sources 50 are filtered by respective filters 55 prior to the voltage signals being applied to the potential generating elements. For example, in various embodiments, voltage sources 50 are controlled by the controller 30 to generate voltage signal sequences that are filtered by respective filters 55 and applied to respective control electrodes of the confinement apparatus 120 to generate one or more potential wells and/or a potential surface.

In various embodiments, a computing entity 10 is configured to allow a user to provide input to the quantum computer 110 (e.g., via a user interface of the computing entity 10) and receive, view, and/or the like output from the quantum computer 110. The computing entity 10 may be in communication with the quantum system controller 30 of the quantum computer 110 via one or more wired or wireless networks 20 and/or via direct wired and/or wireless communications. In an example embodiment, the computing entity 10 may translate, configure, format, and/or the like information/data, quantum computing algorithms and/or circuits, and/or the like into a computing language, executable instructions, command sets, and/or the like that the quantum system controller 30 can understand and/or implement. For example, the controller 30 is configured to generate machine code level commands configured to, when executed by the appropriate components of the quantum computer 110, cause the performance of a quantum circuit by the quantum computer 110. In various embodiments the computing entity 10 may provide quantum computing algorithms and/or circuits in a computing language that the quantum system controller 30 resolves into operations and/or individual or sets of machine code level commands.

In various embodiments, the quantum system controller 30 is configured to control the voltage sources 50, cryostat system and/or vacuum system controlling the temperature and pressure within the cryostat and/or vacuum chamber 40, manipulation sources 60, and/or other systems controlling various environmental conditions (e.g., temperature, pressure, and/or the like) within the cryostat and/or vacuum chamber 40 and/or configured to manipulate and/or cause a controlled evolution of quantum states of one or more manipulatable objects confined by the confinement apparatus 120 and being used, for example, as qubits of the quantum processor 115. For example, the quantum system controller 30 may cause a controlled evolution of quantum states of one or more manipulatable objects confined by the confinement apparatus 120 to execute a quantum circuit and/or algorithm. For example, the quantum system controller 30 may cause a reading procedure comprising coherent shelving to be performed, possibly as part of executing a quantum circuit and/or algorithm. Additionally, the quantum system controller 30 is configured to communicate and/or receive input data from the optics collection system 70 and corresponding to the reading of the quantum state of qubits of the quantum computer 110. In various embodiments, at least some of the manipulatable objects confined within the confinement apparatus 120 are used as qubits of the quantum computer 110.

Figure 2:
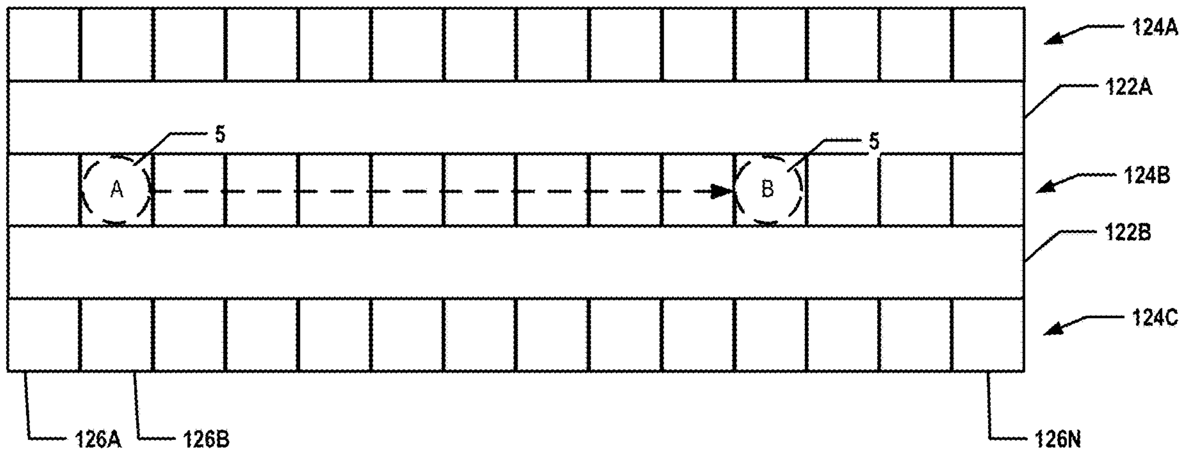
FIG. 2 is an example top view of a portion of an example confinement apparatus, according to an example embodiment.

FIG. 2 illustrates a top view of a portion of a confinement apparatus 120. The illustrated portion of the confinement apparatus 120 includes radio frequency (RF) rails 122A, 122B and three sequences of control electrodes 124A, 124B, 124C. Each sequence of control electrodes 124 comprises a plurality of control electrodes 126. For example, the illustrated portion of the sequence of control electrodes 124C includes control electrodes 126A, 126B, . . . , 126N.

In various embodiments, RF voltage sources of the voltage sources 50 generate and provide an RF voltage signal that is applied to the RF rails 122A, 122B to generate a pseudopotential that defines one or more linear confinement regions of the confinement apparatus 120. The manipulatable objects confined by the confinement apparatus 120 are confined in the one or more linear confinement regions.

The manipulatable objects may be transported between different locations of the confinement apparatus 120 through the application of sets of voltage signal sequences to the control electrodes 126. For example, the manipulatable object 5 may be transported from a starting location at location A to a destination location at location B of the confinement apparatus 120. Both the location A and the location B are partially defined by the one or more sets of linear confinement regions. For example, the location A and the location B are each located within a respective linear confinement region. For example, the controller 30 may be configured to control the voltage sources 50 to cause performance of a transport operation on a manipulatable object (or group of manipulatable objects and/or multiple manipulatable objects).

For example, the controller 30 causes the voltage sources 50 to generate voltage signal sequences and provide the voltage signal sequences. The voltage signal sequences are each filtered by a respective filter 55 and then applied to a respective control electrode 126 (e.g., via traces, leads, and/or the like). In an example embodiment, the filters 55 are formed and/or disposed on the same chip and/or substrate as the confinement apparatus 120. In an example embodiment, the filters 55 are formed and/or disposed separate (e.g., outside of the cryostat and/or vacuum chamber 40) from the confinement apparatus 120.

In an example embodiment, each filter 55 is configured to filter the voltage signal sequence applied to a respective control electrode 126. For example, the filters 55 may comprise a plurality of filters with each filter corresponding to a respective control electrode 126. In various embodiments, the filters 55 may be designed to have similar or different response functions, as appropriate for the application.

In general, the filters 55 are low-pass filters, band pass filters, and/or the like configured to prevent high frequency noise in the voltage signal sequences from being applied to the respective control electrodes 126. However, this filtering may result in changes to the voltage signal sequences that reduce the efficiency with which transport operations may be performed (e.g., via application of the filtered voltage signal sequences to the control electrodes 126).

One example technique for determining a set of voltage signal sequences for use in performing a transport operation includes optimizing a function where the input is the set of voltage signal sequences, and the output is some function of the transport time, manipulatable object heating (e.g., caused by the transporting of the manipulatable object(s)), difference between desired final manipulatable object configuration and the actual manipulatable object configuration, and/or the like either through simulation or experimental measurement. While desirable in many ways, this technique is expensive in compute time and/or experiment time. As a simpler and less expensive approach, rather than model or measure the physics of one or more manipulatable objects moving according to the electric potentials of the confinement apparatus, one can model only the electric potentials and try to find sets of voltage signal sequences that yield time-dependent potentials satisfying certain conditions that are expected to yield good transport.

Such conventional approaches have relied on solving the set of voltage signal sequences timestep by timestep without considering the filters and then, in some cases, "predistorting" the voltage signals to approximately invert the action of the filters on the voltage signal sequences. However, these techniques result in a down selection process that require a significant number of user iterations to determine a usable set of voltage signal sequences. Additionally, predistorting the voltage signals inherently introduces approximations into the system which in turn can introduce systemic error into the system. Thus, technical problems exist regarding how to determine sets of voltage signal sequences that enable efficient performance of respective transport operations in a user time and computational cost-efficient manner.

Moreover, transport operations can be a significant source of manipulatable object heating, which is generally undesired. Therefore, additional technical problems exist regarding how to determine a set of voltage signal sequences that enable efficient performance of transport operations with minimized and/or low manipulatable object heating.

Various embodiments provide technical solutions to these technical problems. For example, in various embodiments the filter response functions of the filters 55 are incorporated directly into the process of determining the voltage signal sequences. However, this causes the equations used in the determining of the voltage signal sequences at different time steps to be become coupled. For example, due to the filter response function of a filter, the filtered voltage signal sequence value at a time $t_i$ may depend on the voltage signal sequence value at a time $t_{-1}$. Thus, in various embodiments, the voltage signal sequence values for a plurality of time steps are determined simultaneously and/or synchronously. In an example embodiment, the problem of determining the voltage sequence signals is posed as a constrained least squares fit, which can be presented and solved as a large, multi-time step quadratic program (QP).

Example Operation of a Computing Entity 10 to Determine a Set of Voltage Signal Sequences In various embodiments, the quantum computer 110 is configured to use a plurality of sets of voltage signal sequences, where each set of voltage signal sequences is configured for performing a particular transport operation. For example, a first set of voltage signal sequences may be used to cause the manipulatable object 5 to be transported from the starting location of location A to the destination location of location B and a second set of voltage signal sequences is used to cause the manipulatable object 5 to be transported from the location B to a third location (not shown).

In various embodiments, the sets of voltage signal sequences are determined by a computing entity, such as computing entity 10, for example. In various embodiments, the sets of voltage signals are determined offline (e.g., not in real-time with the use of the sets of voltage signals by the quantum computer 110) and stored to a memory accessible to the controller of the quantum computer (e.g., memory 710 of the controller 30 as shown in FIG. 7 or memory 822, 824 of the computing entity 10 as shown in FIG. 8). In an example embodiment, a set of voltage signals is determined in real-time by the computing entity 10 and passed to the controller 30 as needed.

In various embodiments, each set of voltage signal sequences corresponds to a transport operation. In various embodiments, the transport operation corresponding to a set of voltage signals may be defined by a starting location and a destination location of the transport operation. For example, when the respective filter responses of the filters 55 have significant variation, a set of voltage signal sequences may correspond to a specific starting location and/or destination location. In various embodiments, the set of voltage signal sequences corresponds to a length of the transport operation (e.g., a distance between the starting location and the destination location of the transport operation). For example, when the filters 55 have substantially consistent filter responses, a set of voltage signal sequences may correspond to the length of the transport operation. In another example embodiment, when the respective filter responses of the filters 55 are substantially consistent with one another and/or substantially similar to one another and the set of voltage signal sequences corresponds to a motion primitive. For example, a motion primitive may be a type of a transport operation. For example, a transport operation may be classified by a type that indicates a particular distance in a particular direction (e.g., one step to the right, two steps to the left, and/or the like).

In various embodiments, a set of voltage signal sequences is a solution to $$\min_v \|Av - b\|^2$$

subject to $l \preccurlyeq Cv \preccurlyeq u$, where $p \preccurlyeq q$, for vector p and vector q when $p_i \leq q_i$ for all i. The vector v is the set of voltage signal sequences, the vector l defines a lower bound of various constraints of quadratic program, the vector u is an upper bound of various constraints of the quadratic program, the constraint matrix C defines constraints of the system such as electric potential derivatives at different points in space and/or time along a transport path corresponding to the set of voltage signal sequences and/or the like. The vector b represents target values for various linear functionals of the set of voltage signal sequences. For example, the vector b may include target values for the xx-derivative at various control points at each time point. In an example embodiment, element $A_{j,k}$ of the cost matrix A represents a spatial derivative of the electric potential of electrode k at a plurality of time steps of the corresponding transport operation and element $b_j$ of the vector b includes the pseudopotential contribution at set of spatial points at the plurality of time steps and the target values for the total electric potential at the set of spatial points at the plurality of time steps. In an example embodiment, element $A_{j,k}$ of the cost matrix A is a (possibly scaled) identify matrix and element $b_j$ of the vector b is a zero vector such that a cost is associated with the voltages themselves. In an example embodiment, the problem is posed a least squares fit that can be written as the quadratic program $$\min_v \frac{1}{2} v^T A^T A v - b^T A v$$

subject to $l \preccurlyeq Cv \preccurlyeq u$. The quadratic program may then be solved using various quadratic program solvers, as appropriate for the application to obtain the set of voltage signal sequences provided by the vector v. In various embodiments, the cost matrix A include weights that determine how hard the quadratic program solvers should push to achieve the target values provided by the vector b.

In various embodiments, the filter representations are included in the cost matrix A and/or the constraint matrix C. For example, for any row of the cost matrix A and/or the constraint matrix C to act on the filtered waveforms, the row is of the form $a=\hat{a}F$ (or $c=\hat{c}F$, respectively), where F is the filter response representation of the filters 55 such that if v is the unfiltered set of voltage signal sequences, FIT is the filtered set of voltage signal sequences, and $\hat{a}$ (or $\hat{c}$, respectively) represents the linear functional acting on the filtered set of voltage signal sequences. In various embodiments, some costs and constraints (e.g., costs and/or constraints related to the shape of the potential surface) act on the filtered set of voltage signal sequences while other costs and constraints (e.g., costs and/or constraints related to hardware voltage limits) act on the unfiltered set of voltage signal sequences. For example, a row of the cost matrix A and/or constraint matrix C corresponding to the shape of the potential surface is of the form $a=\hat{a}F$ (or $c=\hat{c}F$, respectively), and a row of the cost matrix A and/or constraint matrix C corresponding to hardware voltage limits is of the form $a=\hat{a}$ (or $c=\hat{c}$, respectively), without including the representation of the filters 55.

Figure 3:
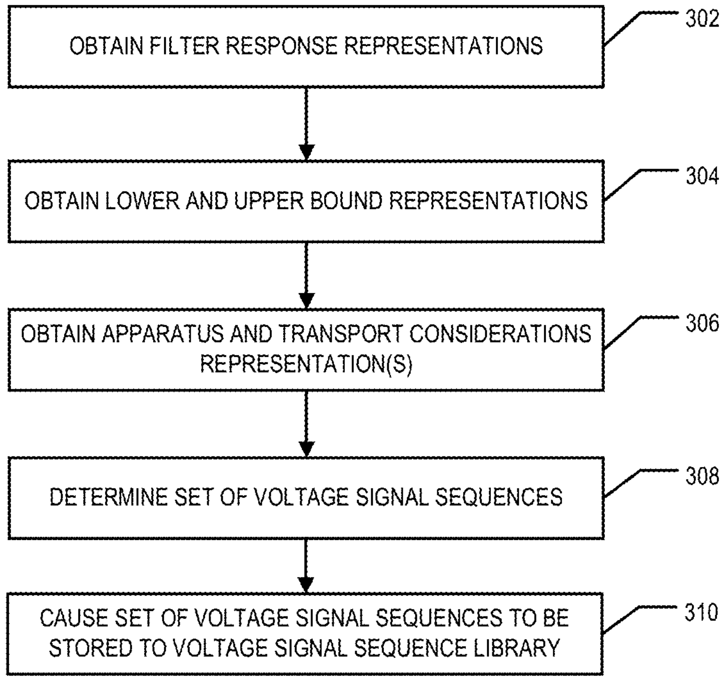
FIG. 3 is a flowchart illustrating various processes, operations, and/or procedures performed by a computing entity, such as the computing entity of FIG. 8, to generate and/or determine a set of voltage signal sequences, according to various embodiments.

FIG. 3 provides a flowchart illustrating various processes, procedures, operations, and/or the like performed by a classical computer, such as computing entity 10, for example, to determine voltage signal sequences for use in performing a transportation operation of a manipulatable object from a starting location to a destination location of the confinement apparatus 120.

Starting at step/operation 302, filter response representations for the filters 55 are obtained. For example, the computing entity 10 may receive, determine, and/or access from memory filter response representations for the filters 55. In various embodiments, the filter response representations are generated based at least in part on experimental measurements of the filter response(s) of the one or more filters 55. In various embodiments, the filter response representations are generated based at least in part on simulation results of the filter response(s) of the one or more filters 55.

In various embodiments, the filter response representations are generated based at least in part by transforming the empirically derived or simulated filter response as function of frequency to a function of time (e.g., via a Fourier transform).

In an example embodiment, the frequency response representation is a matrix model of the frequency response. In various embodiments, the filter response representation links one or more time steps of the sequences. For example, a filtered voltage signal generated by a filter 55 filtering a voltage signal at time $t_i$ may be at least in part dependent on the filtered voltage signal and/or the voltage signal at time $t_j$, where $j<i$ (e.g., j may equal $i-1$). Thus, the filter response representations may link various time steps such that the individual time steps of the set of voltage signal sequences are not able to be determined independently and/or separately.

Figure 4:
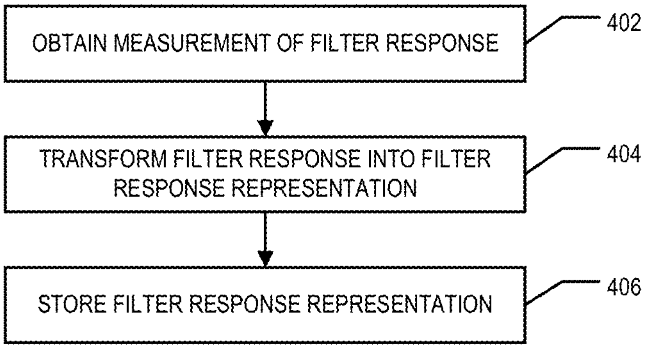
FIG. 4 is a flowchart illustrating various processes, operations, and/or procedures performed by a computing entity, such as the computing entity of FIG. 8, to generate and/or determine and store a filter response representation, according to various embodiments.

FIG. 4 provides a flowchart illustrating various processes, procedures, operations, and/or the like performed by a computing entity 10, for example, for obtaining a filter response representation. For example, the processes, procedures, operations and/or the like shown in FIG. 4 are performed as at least part of step/operation 302, in an example embodiment.

In various embodiments, the processes, procedures, operations, and/or the like of FIG. 4 may be performed for each filter of the filters 55. In various embodiments, one instance of performing the processes, procedures, operations, and/or the like of FIG. 4 may be used to determine the respective filter response representations of two or more of the filters 55.

Starting at step/operation 402, the computing entity 10 obtains measurement of a filter response for one or more filters 55. For example, the processing element(s) 808 of the computing entity 10 (see FIG. 8) may receive (e.g., via network interface 820, receiver 806, a user input interface such as keyboard 818, and/or the like) empirical and/or simulated data and determine a frequency response for the one or more filters 55 by analyzing the empirical and/or simulated data. In another example embodiment, the processing element(s) 808 may receive a filter response for one or more filters 55 (e.g., via network interface 820, receiver 806, a user input interface such as keyboard 818, and/or the like) and/or access a filter response for one or more filters 55 (e.g., from memory 822, 824).

At step/operation 404, the computing entity 10 transforms the filter response into a filter response representation. For example, the processing element(s) 808 of the computing entity 10 may use a Fourier transform, for example, to convert the filter response from the frequency domain to the time domain or vice versa, as appropriate for the application. In various embodiments, the filter response is further transformed into a filter response representation by generating a matrix representation of the filter response and/or the Fourier transform thereof.

In an example embodiment, the filter response is represented via a mathematical model with a small number of parameters such as, for example, a 5-pole Butterworth filter with a cut off frequency. In an example embodiment, the cut off frequency is 200 kHz. In such an embodiment, a filter response representation (in the form of a matrix) is generated based on the mathematical model thereof and an interpolated representation of the waveform (e.g., a spline interpolated representation of the waveform).

In an example embodiment, the filter transfer function is measured (e.g., in the lab). The filter transform function is a description and/or representation of the filter as a function that multiplies the Fourier transform of the input signal to provide a representation of the filtered signal. In such an embodiment, the filter response representation (in the form of a matrix) is generated based on multiplying the Fourier transform of the set of voltage signal sequences by the measured filter transfer function (possibly with the use of some interpolation between measured values) and taking the inverse Fourier transform of the resulting product.

At step/operation 406, the computing entity 10 stores and/or causes storing of the filter response representation to a memory accessible to the controller 30 (e.g., (e.g., memory 710 of the controller 30 or memory 822, 824 of the computing entity 10). In various embodiments, the filter response representation is stored as part of a filter response representation database or other data store in which each filter response representation is indexed by an identifier for one or more of the control electrodes 126 for which the filter response representation provides a representation of the respective filter response. In an example embodiment, a plurality of the filters 55 are designed to have substantially the same filter response and the same filter response representation is associated with and/or assigned to each filter of the plurality of the filters.

Returning to FIG. 3, at step/operation 304, lower and upper bound representations are obtained. For example, the computing entity 10 may receive (e.g., via network interface 820, receiver 806, a user input interface such as keyboard 818, and/or the like) representations of the lower and upper bound vectors l, u. For example, the computing entity 10 may access predefined lower and upper bound vectors l, u from memory (e.g., memory 822, 824).

At step/operation 306, apparatus and transport considerations representations are obtained. For example, the computing entity 10 may obtain apparatus considerations corresponding to constraints and/or costs of the quantum computer 110. For example, the apparatus considerations may relate to constraints on the operation of the confinement apparatus 120 such that the confinement apparatus 120 is capable of confining the manipulatable objects, operational constraints on voltage sources 50 (e.g., voltage signals the voltage sources 50 is capable of generating, update/slew rates the voltage sources are capable of operating at, achievable voltage signal changes between adjacent updates, geometry information about respective control electrodes, a relative layout of the control electrodes 126, and/or the like), constraints and/or costs imposed by the filters 55 (e.g., as represented by the filter response representation(s)), and/or the like. For example, the transport considerations may relate to constraints on and/or costs for the desired transportation function to be performed. For example, the transport considerations may include and/or be determined based on the starting location and ending point of the transport operation, a distance over which the manipulatable object is to be transported, a number of manipulatable objects to be transported together as part of the transport operation, the transport profile, and/or the like.

In various embodiments, the computing entity 10 may receive (e.g., via network interface 820, receiver 806, a user input interface such as keyboard 818, and/or the like) apparatus and transport considerations representations. In various embodiments, the computing entity 10 may access apparatus and transport considerations representations from memory (e.g., memory 822, 824). In an example embodiment, the computing entity 10 may receive and/or access information from which one or more apparatus and/or transport considerations representations may be determined. For example, the computing entity 10 may receive and/or access one or more filter response representations for one or more filters 55. The computing entity 10 may then apply the one or more filter response representations in the determination of at least one apparatus and/or transport consideration (e.g., apparatus and/or transport considerations corresponding to the shape of the potential surface, and/or the like).

Figure 5:
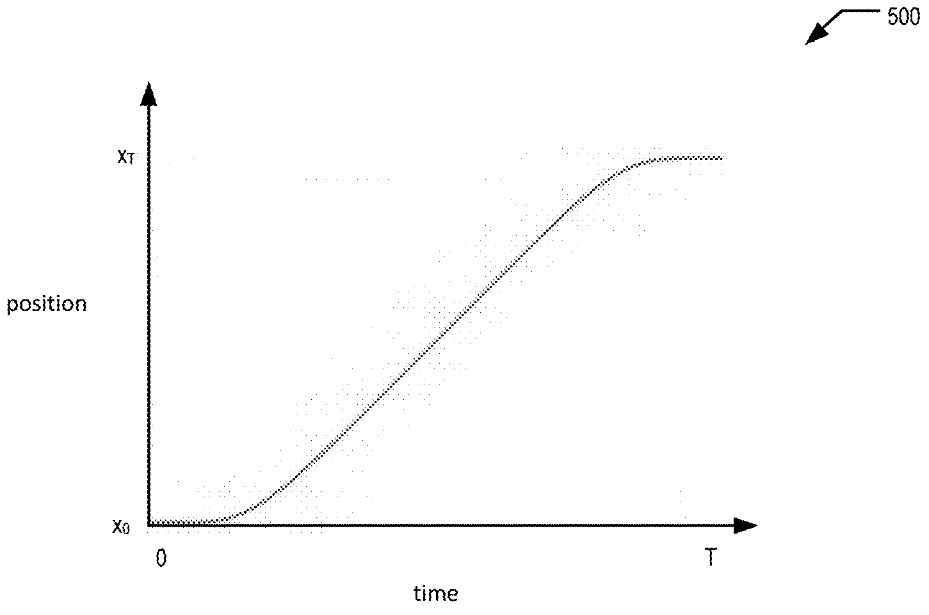
FIG. 5 is a plot illustrating an example transport profile, according to various embodiments.

In various embodiments, the computing entity 10 may receive and/or access a transport profile and determine various transport considerations based thereon. In various embodiments, the transport profile is a description of how the potential well moves with time during the transport operation. FIG. 5 illustrates an example transport profile 500 corresponding to the transport of an electric potential well (which may carry within it one or more manipulatable objects 5 and/or otherwise cause transportation of the one or more manipulatable objects) from a starting location $x_0$ at a starting time $t_0=0$ to a destination location $x_T$ at a final time $t_f=T$.

In various embodiments, the transport profile is continuous (e.g., does not contain any discontinuities). In various embodiments, the transport profile is free of discontinuities in all derivatives.

In various embodiments, one or more derivatives (with respect to time) of the transport profile are equal to zero at the starting time and at the final time. For example, in an example embodiment, the first and second derivatives of the transport profile with respect to time are equal to zero. In an example embodiment each derivative (with respect to time) of the transport profile (to arbitrary order) is equal to zero at the starting time and at the final time.

In various embodiments, the transport profile is a sigmoidal function. For example, the illustrated transport profile 500 is the function $$f(t) = x_0 + (x_T - x_0)\frac{1 + \tanh\left[\tan\left(\pi\left(\frac{t}{T} - \frac{1}{2}\right)\right)\right]}{2},$$

from time $t_0=0$ to $t_f=T$.

In an example embodiment, the transport profile is configured to support transitionless transport. Transitionless transport occurs when (theoretically) a manipulatable object does not get heated as a result of the transport operation. As should be understood, imperfections in the design and/or operation of the confinement apparatus 120, voltage sources 50, filters 55, and/or the like may result in some empirical heating of the manipulatable objects when a transport operation is performed using transitionless transport. In various embodiments, the transport profile satisfies $$x(t) = \left(1 + \frac{1}{\omega^2}\frac{d^2}{dt^2}\right)^{n+1}\phi(t),$$

where ω is the trap frequency of the confinement apparatus 120 and ϕ(t) is a function on the inclusive range t=[0, T], such that the transport is transitionless with a robustness up to the nth order of the trap frequency ω. In an example embodiment, $$\phi(t) = f(t) = x_0 + (x_T - x_0)\frac{1 + \tanh\left[\tan\left(\pi\left(\frac{t}{T} - \frac{1}{2}\right)\right)\right]}{2},$$

such that ϕ(t) is a sigmoidal function.

In various embodiments, the computing entity 10 receives and/or access information corresponding to the apparatus and/or transport considerations and then generates and/or determines apparatus and transport considerations representations based thereon. In various embodiments, the apparatus and transport considerations representations are the cost and constraint matrices A and C that are part of the quadratic program described above.

Continuing with FIG. 3, at step/operation 308, the set of voltage signal sequences for the transport operation are determined. For example, the computing entity 10 determines the set of voltage signal sequences for the transport operation based at least in part on the lower and upper bound representations and the apparatus and/or transport considerations. As described above, in various embodiments, the apparatus and/or transport considerations are determined based at least in part on the filter response representations for the filters 55. Thus, the set of voltage signal sequences for the transport operation are determined at least in part based on the filter response representations of the filters 55 configured to filter respective voltage signal sequences applied to the respective control electrodes 126 of the confinement apparatus 120 during the performance of the transport operation. Notably, all time steps of the set of voltage signal sequences are determined simultaneously and/or synchronously.

For example, in an example embodiment, the computing entity 10 executes (e.g., via processing element(s) 808) a quadratic program solver to determine at least one solution to quadratic program $$\min_v \frac{1}{2} v^T A^T A v - b^T A v$$

subject to $l \preccurlyeq Cv \preccurlyeq u$, wherein the cost matrix A and the constraint matrix C encode the apparatus and/or transport considerations, which are determined at least in part based on the filter response representations. For example, the lower bound l, upper bound u, cost matrix A, constraint matrix C, and vector b may be provided as input to quadratic program solver and the quadratic program solver may provide the set of voltage signal sequences v may be obtained as output thereof.

The set of voltage signal sequences is a set of time-ordered sequences of voltage signals, with each sequence corresponding to a respective control electrode 126 and each voltage signal of each sequence corresponding to a respective time step of the transport operation.

At step/operation 310, the set of voltage signal sequences are stored in a voltage signal sequence library. In an example embodiment, the voltage signal sequence library is stored in a memory accessible to the controller 30 (e.g., memory 710, memory 822, 824). For example, the computing entity 10 may cause the set of voltage signal sequences to be stored in a voltage signal sequence library in a memory accessible to the controller (e.g., memory 710, memory 822, 824). The set of voltage signal sequences may then be accessible for use by the controller 30 for performance of one or more transport operations.

As should be understood, the set of voltage signal sequences is particular to the confinement apparatus 120 (e.g., the layout and geometry of the respective control electrodes 126) and the filters 55. As such, the determining of the set of voltage signal sequences is specifically connected to the hardware of the confinement apparatus 120 and the filters 55.

Example Operation of a Controller to Perform a Transport Operation

In various embodiments, the quantum computer 110 performs a transport operation by causing one or more manipulatable objects to be transported from one or more respective starting locations defined by the confinement apparatus 120 to one or more respective destination locations defined by the confinement apparatus 120. In particular, the controller 30 controls the operation of voltage sources 50 such that a set of voltage signal sequences are generated by the voltage sources 50, filtered by respective filters 55, and applied to respective control electrodes 126 of the confinement apparatus 120 such that the transport operation is performed. As described in more detail above, in various embodiments, the set of voltage signal sequences is determined based at least in part on the filter responses of the respective filters 55.

FIG. 6 provides a flowchart illustrating various process, procedures, operations, and/or the like performed by a controller 30 to cause the quantum computer 110 to perform a transport operation. Starting at step/operation 602, the controller 30 identifies a transport operation to be performed. For example, the controller 30 may determine the starting location and/or destination location of a transport operation to be performed, a starting time at or a starting time window within which the transport operation is be initiated, and/or the like.

In various embodiments, the transport operation to be performed is identified based at least in part on a quantum circuit and/or algorithm being performed by the quantum computer 110. For example, while the controller 30 is controlling operation of various components of the quantum processor 115 to perform at least a portion of the quantum circuit and/or algorithm, the controller 30 determines that a transport operation is to be performed as part of the performance of the quantum circuit and/or algorithm. The controller 30 may then identify the particular transport operation to be performed based at least in part on the quantum circuit and/or algorithm.

At step/operation 604, the controller 30 obtains a set of voltage signal sequences corresponding to the transport operation. For example, the controller 30 may access a set of voltage signal sequences from a library of voltage signal sequences stored in memory 710 and/or memory 822, 824. For example, the controller 30 may read a file containing the set of voltage signal sequences formatted as a table or in another format. In an example embodiment, the controller 30 generates and provides a call requesting the set of voltage signal sequences from the computing entity 10 and receive a call response including the set of voltage signal sequences. In an example embodiment, the controller 30 may determine the set of voltage signal sequences.

For example, the controller 30 identifies a set of voltage signal sequences corresponding to the transport operation. For example, the controller 30 may query the voltage signal sequence library based on the starting location and/or destination location of the transport operation, a length of the transport operation (e.g., distance between the starting location and destination location), motion primitive type (e.g., move one step to right, move two steps to left, and/or the like). The identified set of voltage signal sequences may then be accessed and/or read. As noted above, the set of voltage signal sequences was determined based at least in part on and/or taking into account the filter response of the filters 55. Thus, there is no need to determine a pre-distortion of the voltage signal sequences and approximation introduced by such pre-distortions are therefore not introduced into the system, in various embodiments.

At step/operation 606, the controller 30 controls the operation of one or more voltage sources 50 to cause the voltage sources 50 to generate and provide the sequences of voltage signals indicated by the set of voltage signal sequences. For example, the set of voltage signal sequences may indicate that voltage $V_{a0}$ be applied to a first control electrode 126A at time $t_0$, voltage $V_{a1}$ be applied to the first control electrode 126A at time $t_1$, voltage $V_{a_2}$ be applied to the first control electrode 126A at time $t_2$, voltage $V_{b0}$ be applied to a second control electrode 126B at time $t_0$, voltage $V_{b1}$ be applied to the second control electrode 126B at time $t_1$, voltage $Vb_2$ be applied to the second control electrode 126B at time $t_2$, and so on. Thus, at time $t_0$, the controller 30 controls the voltage sources 50 to generate a voltage signal of voltage $V_{a0}$, provide the voltage signal to a respective filter 55 to generate a first filtered voltage signal, and cause the first filtered voltage signal to be applied to the first control electrode 126A. Also, at time $t_0$, the controller 30 controls the voltage sources 50 to generate a voltage signal of voltage $V_{b0}$, provide the voltage signal to a respective filter 55 to generate a second filtered voltage signal, and cause the second filtered voltage signal to be applied to the second control electrode 126B. Similarly, at time $t_1$, the controller 30 controls the voltage sources to generate respective voltage signals of voltage $V_{a1}$ and $V_{b1}$, provide the voltage signals to respective filters 55 to generate first and second filtered voltage signals, and cause the first and second filtered voltage signals to be applied to respective ones of the first and second control electrodes 126A, 126B. The process continues for each time step until the final time step $t_f$=T is reached, and the final (filtered) voltage signals of the transport operation are applied to the respective control electrodes 126.

In various embodiments, the controller 30 is configured to cause the respective voltage signals applied to the control electrodes 126 at time $t_i$ to transition smoothly to the respective voltage signals applied to the control electrodes 126 at time $t_{i+1}$. For example, the controller 30 may control the operation of the voltage sources 50 such that the voltage signals change ins a smooth and/or continuous manner rather than jumping directly from voltage $V_i$ at time $t_i$ to voltage $V_{i+1}$ at time $t_{i+1}$. In other words, the applied voltages are change in a continuous and/or incremental manner rather than as a single step step function, in various embodiments. In an example embodiment, the filters 55 are configured to cause the change in voltage between the voltage signal $V_i$ at time $t_i$ to voltage $V_{i+1}$ at time $t_{i+1}$ to be smooth and/or continuous (e.g., not a single step step function).

Exemplary Quantum System Controller

In various embodiments, a quantum computer 110 comprises a quantum system controller 30 and a quantum processor 115. The quantum system controller 30 is configured to control various components of a quantum processor 115. For example, various embodiments are configured to perform one or more transport operations. In various embodiments, a transportation operation causes the transport of one or more manipulatable objects from respective starting locations to respective destination locations, where the starting location and destination locations are defined by the confinement apparatus 120 (e.g., within one or more confinement regions thereof).

In various embodiments, the quantum system controller 30 is in communication with voltage sources 50, manipulation sources 60, optics collection system 70 and/or other components of the quantum processor 115 such that the controller 30 is configured to control operation of the components of the quantum processor 115 and/or receives sensor measurements captured thereby. In various embodiments, the quantum system controller 30 is further configured to control a cryostat system and/or vacuum system controlling the temperature and pressure within the cryostat and/or vacuum chamber 40, cooling system, and/or other systems controlling the environmental conditions (e.g., temperature, humidity, pressure, and/or the like) within the cryostat and/or vacuum chamber 40.

As shown in FIG. 7, in various embodiments, the quantum system controller 30 may comprise various quantum system controller elements including processing elements 705, memory 710, driver controller elements 715, a communication interface 720, analog-digital (A/D) converter elements 725, and/or the like. In various embodiments, the quantum system controller 30 is configured to receive input data generated by the optics collection system via the A/D converter(s) 725. In various embodiments, the processing element(s) 705 are configured to operate as described herein. In various embodiments, the quantum system controller 30 may include additional quantum system controller elements as described herein.

In various embodiments, the processing element(s) 705 comprise processing devices such as programmable logic devices (CPLDs), microprocessors, coprocessing entities, application-specific instruction-set processors (ASIPs), integrated circuits, application specific integrated circuits (ASICs), field programmable gate arrays (FPGAs), programmable logic arrays (PLAs), hardware accelerators, other processing elements and/or circuitry, and/or the like. The term circuitry may refer to an entirely hardware embodiment or a combination of hardware and computer program products. In an example embodiment, a processing element 705 of the quantum system controller 30 comprises a clock and/or is in communication with a clock.

In various embodiments, the memory 710 comprises non-transitory memory such as volatile and/or non-volatile memory storage such as one or more of hard disks, ROM, PROM, EPROM, EEPROM, flash memory, MMCs, SD memory cards, Memory Sticks, CBRAM, PRAM, FeRAM, RRAM, SONOS, racetrack memory, RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. In various embodiments, the memory 710 may store a voltage signal sequence library storing a plurality of sets of voltage signal sequences for use in performing respective transport operations, a queue of commands to be executed to cause a quantum algorithm and/or circuit to be executed (e.g., an executable queue), qubit records corresponding the qubits of quantum computer (e.g., in a qubit record data store, qubit record database, qubit record table, and/or the like), a calibration table, computer program code (e.g., in a one or more computer languages, specialized quantum system controller language(s), and/or the like), and/or the like. In an example embodiment, execution of at least a portion of the computer program code stored in the memory 710 (e.g., by a processing element 705) causes the quantum system controller 30 to perform one or more steps, operations, processes, procedures and/or the like for generating one or more sets of commands configured to cause the quantum processor 115 to perform at least a portion of a quantum circuit; to update one or more qubit registries; and/or the like. In an example embodiment, execution of at least a portion of the computer program code stored in the memory 710 causes the quantum system controller 30 to cause one or more commands to be performed. In various embodiments, the one or more commands include commands that cause the voltage sources 50 to provide respective voltage signal sequences that are filtered by respective filters 55 and then applied to respective control electrodes 126 to cause a transport operation to be performed.

In various embodiments, the driver controller elements 715 include one or more drivers and/or quantum system controller elements each configured to control one or more drivers. In various embodiments, the driver controller elements 715 may comprise drivers and/or driver controllers. For example, the driver controllers may be configured to cause one or more corresponding drivers to be operated in accordance with executable instructions, commands, and/or the like generated, scheduled. and executed by the quantum system controller 30. For example, the processing element 705 may generate one or more commands to be performed by a first driver. For example, the controller 30 may control operation of one or more voltage sources 50 via one or more respective driver controller elements 715.

In various embodiments, the driver controller elements 715 enable the quantum system controller 30 to operate a voltage sources 50, manipulation sources 60, cooling system, vacuum systems, and/or the like. In various embodiments, the drivers may be laser drivers (e.g., configured to operate and/or control one or more manipulation sources 60); vacuum component drivers; drivers for controlling the flow of current and/or voltage applied to electrodes (e.g., configured to operate and/or control one or more voltage sources 50) used for maintaining and/or controlling the trapping potential of the confinement apparatus 120 (and/or other drivers for providing driver action sequences to potential generating elements of the confinement apparatus); cryostat and/or vacuum system component drivers; cooling system drivers, and/or the like.

Each driver controller element 715 corresponds to an endpoint within the system (e.g., a component of a manipulation source 60, a component of a voltage source 50 (radio frequency voltage source, AWG, DDS), and/or other waveform generator), a component of a cooling and/or vacuum system, a component of the optics collection system 70, and/or the like), in an example embodiment. Each endpoint within the quantum computer 110 represents an individual hardware control. Each endpoint has its own set of accepted micro-commands, in various embodiments. Examples include but are not limited to a voltage source 50 such as a DDS or AWG, component of an optics collection system 70 such as a photomultiplier tube (PMT) or other photodetector, a component of a manipulation source 60 such as a laser driver and/or optical modulator switch, and/or general-purpose output (GPO). Individual commands for a DDS, AWG or other waveform generator allow for setting power level, frequency, and/or phase of a voltage signal generated thereby. Commands for a PMT or other photodetector interface include start/stop photon count and reset of count, in various embodiments. Commands for a GPO endpoint include setting and/or clearing one or more output lines. These output lines can be used to control external hardware in a manner synchronized with the quantum circuit execution.

In various embodiments, the quantum system controller 30 comprises means for communicating and/or receiving signals from one or more optical receiver components (e.g., of the optics collection system 70). For example, the quantum system controller 30 may comprise one or more analog-digital (A/D) converter elements 725 configured to receive signals from one or more optical receiver components (e.g., a photodetector of the optics collection system 70), calibration sensors, and/or the like. In various embodiments, the A/D converter elements 725 are configured to write the input data generated by converting the received signals generated by one or more optical receiver components of the optics collection system 70 to memory 710.

In various embodiments, the quantum system controller 30 may comprise a communication interface 720 for interfacing and/or communicating with, for example, a computing entity 10. For example, the quantum system controller 30 may comprise a communication interface 720 for receiving executable instructions, command sets, and/or the like from the computing entity 10 and providing output received from the quantum computer 110 (e.g., from an optics collection system 70) and/or the result of a processing the output to the computing entity 10. In various embodiments, the computing entity 10 and the quantum system controller 30 may communicate via a direct wired and/or wireless connection and/or via one or more wired and/or wireless networks 20.

Exemplary Computing Entity

FIG. 8 provides an illustrative schematic representative of an example computing entity 10 that can be used in conjunction with embodiments of the present disclosure. In various embodiments, a computing entity 10 is a classical (e.g., semiconductor-based) computer configured to allow a user to provide input to the quantum computer 110 (e.g., via a user interface of the computing entity 10) and receive, display, analyze, and/or the like output from the quantum computer 110.

As shown in FIG. 8, a computing entity 10 can include an antenna 812, a transmitter 804 (e.g., radio), a receiver 806 (e.g., radio), and a processing element 808 that provides signals to and receives signals from the transmitter 804 and receiver 806, respectively. The signals provided to and received from the transmitter 804 and the receiver 806, respectively, may include signaling information/data in accordance with an air interface standard of applicable wireless systems to communicate with various entities, such as a quantum system controller 30, other computing entities 10, and/or the like. The computing entity 10 can include a network interface 820, which may provide signals to and receive signals in accordance with an interface standard of applicable network systems to communicate with various entities, such as a quantum system controller 30, other computing entities 10, and/or the like.

In this regard, the computing entity 10 may be capable of operating with one or more air interface standards, communication protocols, modulation types, and access types. For example, the computing entity 10 may be configured to receive and/or provide communications using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 10 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The computing entity 10 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Via these communication standards and protocols, the computing entity 10 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The computing entity 10 can also download changes, add-ons, and updates, for instance, to its firmware, software (e.g., including executable instructions, applications, program modules), and operating system.

The computing entity 10 may also comprise a user interface device comprising one or more user input/output interfaces (e.g., a display 816 and/or speaker/speaker driver coupled to a processing element 808 and a touch screen, keyboard, mouse, and/or microphone coupled to a processing element 808). For instance, the user output interface may be configured to provide an application, browser, user interface, interface, dashboard, screen, webpage, page, and/or similar words used herein interchangeably executing on and/or accessible via the computing entity 10 to cause display or audible presentation of information/data and for interaction therewith via one or more user input interfaces. The user input interface can comprise any of a number of devices allowing the computing entity 10 to receive data, such as a keyboard/keypad 818 (hard or soft), a touch display, voice/speech or motion interfaces, scanners, readers, or other input device. In embodiments including a keyboard/keypad 818, the keyboard/keypad 818 can include (or cause display of) the conventional numeric (0-9) and related keys (#, *), and other keys used for operating the computing entity 10 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the computing entity 10 can collect information/data, user interaction/input, and/or the like.

The computing entity 10 can also include volatile storage or memory 822 and/or non-volatile storage or memory 824, which can be embedded and/or may be removable. For instance, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the computing entity 10.

CONCLUSION

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A controller configured to control operation of a confinement apparatus comprising one or more radio frequency rails and a plurality of control electrodes, the controller comprising a processing element, at least one non-transitory computer-readable memory storing computer-executable instructions and a voltage signal sequence library, the computer-executable instructions configured to, when executed by the processing element, cause the controller to at least:

identify a manipulatable object transport operation to be performed;

obtain a set of voltage signal sequences corresponding to the manipulatable object transport operation to be performed from the voltage signal sequence library; and cause one or more voltage sources to apply respective voltage signal sequences of the set of voltage signal sequences corresponding to the manipulatable object transport operation to respective control electrodes of the plurality of control electrodes via respective filters, wherein the set of voltage signal sequences is determined based at least in part on respective filter responses of the respective filters and the respective filter responses cause coupling of two or more times steps of the set of voltage signal sequences.

2. The controller of claim 1, wherein each voltage signal sequence of the set of voltage signal sequences is a time-ordered sequence of voltage signals with each voltage signal corresponding to a time step of a plurality of time steps of the manipulatable object transport operation.

3. The controller of claim 2, wherein the voltage signals for each time step of the plurality of time steps of the set of voltage signal sequences are determined synchronously.

4. The controller of claim 2, wherein the computer-executable instructions are further configured to, when executed by the processing element, cause the controller to at least cause an applied voltage signal to transition smoothly between an ith voltage signal of the voltage signal sequence corresponding to an ith time step of the plurality of time steps to an i+1th voltage signal of the voltage signal sequence corresponding to an i+1th time step of the plurality of time steps.

5. The controller of claim 1, wherein the set of voltage signal sequences is configured to cause one or more manipulatable objects to be transported from one or more respective starting locations of the manipulatable object transport operation to one or more respective destination locations of the manipulatable object transport operation with respective transport profiles having at least first and second derivatives that are equal to zero at the one or more respective starting locations and at the one or more respective destination locations.

6. The controller of claim 5, wherein the respective transport profiles are each a sigmoidal function.

7. The controller of claim 1, wherein the respective filters are low pass filters.

8. The controller of claim 1, wherein at least one of the respective filter responses is empirically determined.

9. The controller of claim 1, wherein the set of voltage signal sequences is determined based at least in part on apparatus and transportation considerations.

10. The controller of claim 1, wherein the set of voltage signal sequences is configured to cause one or more manipulatable objects to be transported from one or more respective starting locations of the manipulatable object transport operation to one or more respective destination locations of the manipulatable object transport operation with the one or more manipulatable objects being in respective motional states of a same energy at both the one or more respective starting location and the one or more respective destination location.

11. A computer-executable method for determining a set of voltage signal sequences corresponding to a manipulatable object transport operation to be performed within a confinement region defined by a confinement apparatus comprising one or more radio frequency rails and a plurality of control electrodes, the method comprising:

obtaining filter response representations for one or more filters configured to filter respective voltage signals being applied to respective control electrodes of the plurality of control electrodes;

obtaining an apparatus and transport consideration representation, wherein the apparatus and transport consideration representation at least encodes a relative physical layout of the plurality of control electrodes; and based at least in part on the filter response representations and the apparatus and transport consideration representation, synchronously determining a set of voltage signal sequences corresponding to transport of one or more manipulatable objects from one or more respective starting locations of the confinement apparatus to one or more respective destination locations of the confinement apparatus over a period of time, wherein each voltage signal sequence of the set of voltage signal sequences is a time-ordered sequence of voltage signals to be applied to a respective control electrode of the plurality of control electrodes via a respective filter of the one or more filters over a plurality of time steps of the period of time, wherein the respective filter response representations cause coupling of two or more times steps of the set of voltage signal sequences.

12. The method of claim 11, further comprising causing the set of voltage signal sequences to be stored to a voltage signal sequence library accessible to a controller configured to control operation of the confinement apparatus.

13. The method of claim 11, wherein the set of voltage signal sequences is configured to cause the one or more manipulatable objects to be transported from the one or more respective starting locations to the one or more respective destination locations with respective transport profiles having at least first and second derivatives that are equal to zero at the one or more respective starting locations and at the one or more respective destination locations.

14. The method of claim 13, wherein the respective transport profiles are each a sigmoidal function.

15. The method of claim 11, wherein the one or more filters comprise low pass filters.

16. The method of claim 11, wherein at least one of the filter response representations is determined by empirically measuring a filter response of the respective filter and transforming the filter response into a filter response representation.

17. The method of claim 16, wherein the filter response representation causes a linking of an i+1th time step of the plurality of time steps to an ith time step of the plurality of time steps.

18. The method of claim 11, wherein the set of voltage signal sequences is configured to cause the one or more manipulatable objects to be transported from the one or more respective starting locations of the manipulatable object transport operation to the one or more respective destination locations of the manipulatable object transport operation with the one or more manipulatable objects being in a respective motional state of a same energy at both the one or more respective starting locations and the one or more respective destination locations.

19. The method of claim 11, further comprising obtaining lower and upper bound representations, wherein the lower and upper bound representations and the apparatus and transport consideration representation constrain an available solution space within which the set of voltage signal sequences is determined.

20. An apparatus comprising a processing element and at least one non-transitory computer-readable memory storing computer-executable instructions, the computer-executable instructions configured to, when executed by the processing element, cause the apparatus to at least:

obtain filter response representations for one or more filters configured to filter respective voltage signals being applied to respective control electrodes of a plurality of control electrodes;

obtain an apparatus and transport consideration representation, wherein the apparatus and transport consideration representation at least encodes a relative physical layout of the plurality of control electrodes; and based at least in part on the filter response representations and the apparatus and transport consideration representation, synchronously determine a set of voltage signal sequences corresponding to transport of one or more manipulatable objects from one or more respective starting locations of a confinement apparatus comprising the plurality of control electrodes to one or more respective destination locations of the confinement apparatus over a period of time, wherein each voltage signal sequence of the set of voltage signal sequences is a time-ordered sequence of voltage signals to be applied to a respective control electrode of the plurality of control electrodes via a respective filter of the one or more filters over a plurality of time steps of the period of time, wherein the respective filter response representations cause coupling of two or more times steps of the set of voltage signal sequences.

* * * * *